(12) United States Patent
Geeroms et al.

(10) Patent No.: US 10,733,815 B2
(45) Date of Patent: Aug. 4, 2020

(54) METHOD AND SYSTEM FOR SELECTIVE RECALL OF MOTOR VEHICLES

(71) Applicants: Continental Automotive France, Toulouse (FR); Continental Automotive GmbH, Hannover (DE)

(72) Inventors: Julien Geeroms, Toulouse (FR); Jean-Francois Girard, Labarthe-sur-Lèze (FR)

(73) Assignees: Continental Automotive France (FR); Continentla Automotive GmbH (DE)

( * ) Notice: Subject to any disclaimer, the term of this patent is extended or adjusted under 35 U.S.C. 154(b) by 181 days.

(21) Appl. No.: 16/060,170

(22) PCT Filed: Dec. 9, 2016

(86) PCT No.: PCT/EP2016/002083
§ 371 (c)(1),
(2) Date: Jun. 7, 2018

(87) PCT Pub. No.: WO2017/097429
PCT Pub. Date: Jun. 15, 2017

(65) Prior Publication Data
US 2018/0336742 A1 Nov. 22, 2018

(30) Foreign Application Priority Data
Dec. 11, 2015 (FR) .................... 15 62209

(51) Int. Cl.
*G07C 5/00* (2006.01)
*H04W 4/44* (2018.01)
*G07C 5/08* (2006.01)

(52) U.S. Cl.
CPC ............. *G07C 5/008* (2013.01); *G07C 5/085* (2013.01); *G07C 5/0808* (2013.01); *H04W 4/44* (2018.02)

(58) Field of Classification Search
CPC ........ G07C 5/00; G07C 5/008; G07C 5/0808; G07C 5/085; G07C 9/00; G07C 9/27; H04W 4/00; H04W 4/44; B60K 35/00
See application file for complete search history.

(56) References Cited

U.S. PATENT DOCUMENTS

| | | | |
|---|---|---|---|
| 6,028,537 A * | 2/2000 | Suman | B60K 35/00 340/426.14 |
| 6,330,499 B1 | 12/2001 | Chou et al. | |

(Continued)

FOREIGN PATENT DOCUMENTS

| | | |
|---|---|---|
| CN | 102394918 A | 3/2012 |
| CN | 202276367 U | 6/2012 |

(Continued)

OTHER PUBLICATIONS

International Search Report and Written Opinion for International Application No. PCT/EP2016/002083, dated Mar. 3, 2017, 11 pages.

*Primary Examiner* — Yonel Beaulieu
(74) *Attorney, Agent, or Firm* — RatnerPrestia

(57) ABSTRACT

A method for selectively recalling at least one motor vehicle. The method includes the steps of selecting at least one parameter from among the plurality of parameters, sending to the communications module, via the mobile node, a message indicating the parameter selected, collecting from the electronic control unit at least one data item relating to the selected parameter, this collection being performed by the communications module, sending the collected data item from the communications module to the mobile node, sending the sent data item by the mobile node to the management server, analyzing by the management server of the data item received, detecting a defect with the equipment on the basis of the analyzed data item, and determining a subset of (Continued)

vehicles including the equipment for which a defect has been detected so as to be able to proceed with recalling these.

4 Claims, 3 Drawing Sheets

(56) References Cited

U.S. PATENT DOCUMENTS

| | | | | |
|---|---|---|---|---|
| 7,900,051 | B2* | 3/2011 | Wuidart | G06F 21/10 |
| | | | | 713/176 |
| 8,370,020 | B2 | 2/2013 | Bauman et al. | |
| 8,386,115 | B2* | 2/2013 | McCutchen | G06Q 10/00 |
| | | | | 701/29.1 |
| 8,868,427 | B2* | 10/2014 | Rysenga | G06Q 10/109 |
| | | | | 340/521 |
| 8,892,297 | B2* | 11/2014 | Inbarajan | G06Q 10/00 |
| | | | | 701/33.4 |
| 10,373,400 | B2* | 8/2019 | McCutchen | G06Q 10/107 |
| 10,387,826 | B2* | 8/2019 | Simmons | G07C 9/27 |
| 10,423,989 | B2* | 9/2019 | Binion | G06Q 30/0278 |
| 2005/0080606 | A1 | 4/2005 | Ampunan et al. | |
| 2008/0255721 | A1 | 10/2008 | Yamada | |
| 2008/0316006 | A1 | 12/2008 | Bauman et al. | |
| 2012/0296567 | A1* | 11/2012 | Breed | G01C 21/26 |
| | | | | 701/468 |
| 2013/0246135 | A1 | 9/2013 | Wang | |
| 2015/0057875 | A1 | 2/2015 | McGinnis et al. | |

FOREIGN PATENT DOCUMENTS

| | | |
|---|---|---|
| CN | 203086501 U | 7/2013 |
| CN | 103295395 A | 9/2013 |
| CN | 103945373 A | 7/2014 |
| CN | 104034380 A | 9/2014 |
| DE | 102008022771 A1 | 12/2008 |
| KR | 20130030583 A | 3/2013 |
| KR | 20130128765 A | 11/2013 |
| KR | 20140008635 A | 1/2014 |

* cited by examiner

METHOD AND SYSTEM FOR SELECTIVE RECALL OF MOTOR VEHICLES

CROSS REFERENCE TO RELATED APPLICATIONS

This application is the U.S. National Phase Application of PCT International Application No. PCT/EP2016/002083, filed Dec. 9, 2016, which claims priority to French Patent Application No. 1562209, filed Dec. 11, 2015, the contents of such applications being incorporated by reference herein.

FIELD OF THE INVENTION

The present invention relates to the automotive field and relates more particularly to a method and a system for selectively recalling at least one motor vehicle following a defect identified on a piece of equipment of said vehicle.

BACKGROUND OF THE INVENTION

A motor vehicle in a known way comprises a plurality of pieces of equipment performing various functions, notably controlled engine equipment such as, for example, the pump of the fuel injection system, the fuel injectors, the engine management system, etc.

These various pieces of equipment are connected, in the known way, via a wired vehicle communications network referred to as the CAN (Control Area Network) bus, to an electronic control unit of the vehicle known as the ECU.

This electronic control unit collects data relating to these various pieces of equipment in order to control or monitor these.

Nowadays, when a problem occurs with one of these pieces of equipment, the vehicle is taken to the repairer who performs a diagnosis by collecting and analyzing some of this data, known as public data, via a diagnostics device connected to the CAN bus.

When a piece of equipment is defective in a significant number of vehicles, for example several thousand vehicles, the manufacturer may recall said vehicles so as to change the affected equipment, this being expensive and time-consuming.

Furthermore, in a recall, it is not always possible to differentiate between components that are defective and those which are not since, for example, a processor may be fitted under the one same component reference but be supplied either by one supplier or by a competitor. If only the component supplied by only one of the suppliers is defective, it is not always possible to identify which processors are fitted with that component, and so all of the processors bearing that reference are then replaced. In that case, the manufacturer then systematically changes the potentially defective component, and this constitutes a significant disadvantage.

In addition, the time needed to detect a defect with a significant enough number of vehicles to trigger a recall may be relatively long, for example several months or years, and that delays modification of the defective equipment in production accordingly, and therefore constitutes a major disadvantage.

One known solution, described in document U.S. Pat. No. 8,370,020 B2, incorporated by reference herein, uses a Bluetooth® communication module to collect the public data available on the CAN bus of the vehicle and communicate them to a cell phone which transmits them to an Internet server. The server then analyzes the data in order to detect a problem with a piece of the vehicle equipment. This solution does not allow public data available on the CAN bus in limited quantity to be collected, and this constitutes a significant disadvantage. In addition, this solution allows only the vehicle comprising the defective equipment to be recalled, rather than a collection of similar vehicles, and this constitutes a major disadvantage.

Also known is document US 2008/255721 A1, incorporated by reference herein, the key objective of which is to collect anomaly data relating to a diagnostics code, identifying the groups of vehicles concerned, and to communicate wirelessly with a management center handling this data in order in particular for the management center to be informed of these detected anomalies. A dealer may use the diagnostics information recorded on the vehicle. That document is connected with detecting an anomaly using the engine control unit, more particularly the diagnostics unit the purpose of which is to flag up an anomaly or breakdown according to the legislation in force. That document is associated with the emission of a diagnostic signal of DTC (which stands for Diagnostic Trouble Code) type. According to the teachings of that document, the management center observes the confirmed faults communicated by the control unit on board the vehicle, and this for example makes it possible to log transient faults which are not held in memory in the vehicle diagnostics unit, and to inform the manufacturer or the dealers of these events. That document does not relate to a recall or selective recall method.

SUMMARY OF THE INVENTION

An aspect of the invention aims to at least partly overcome these disadvantages by proposing a simple, reliable and effective solution for selectively recalling motor vehicles comprising a defective piece of equipment.

To this end, a very first subject of an aspect of the invention is a method for selectively recalling, using a radio communications network management server, at least one motor vehicle from a collection of motor vehicles, said vehicle comprising at least one piece of equipment of a predetermined type, a wired communications network and an electronic control unit which is configured to receive from said equipment, via said wired communications network, a plurality of data pertaining to a plurality of parameters relating to the equipment, and a communications module configured to collect, from the electronic control unit, via the wired communications network, at least one data item from said plurality of data and communicate it, over a radio communications link, to a mobile node of said radio communications network, said method comprising the steps of:

the selection of at least one parameter from among the plurality of parameters, the sending to the communications module, via the mobile node, of a message indicating the parameter selected, the collection from the electronic control unit of at least one data item relating to said selected parameter, this collection being performed by the communications module, via the wired communications network, the sending of the collected data item from the communications module to the mobile node, the sending of the sent data item by the mobile node to the management server, the analysis by the management server of the data item received, the detection of a defect with the piece of equipment on the basis of the data item analyzed by estimating, from the data item received, the mean life remaining until the piece of equipment breaks down or, alternatively, the margin until the maximum tolerable wear limit is reached, or alternatively still, the statistical position of a command within the tolerated interval in the design of the equipment, the determination of a subset of vehicles comprising the piece of equipment for which a defect has been detected, in order to proceed with recalling these, and the sending, by the management server, of a selective recall notice.

The detection of a defect with a piece of equipment may, for example, be performed by estimating, from the data item received, the mean life remaining until the piece of equipment breaks down or, alternatively, the margin until the maximum tolerable wear limit is reached, or alternatively still, the statistical position of a command within the tolerated interval in the design of the equipment. The detection of a defect with the piece of equipment which is performed by estimating the mean life remaining until the piece of equipment breaks down using the data item collected offers the advantage that the piece of equipment can be repaired or exchanged before the breakdown occurs. The sending of a selective recall notice by the management server, for example on the basis of the identity of the vehicle, can be addressed for example to the owner of the vehicle. The present invention sits upstream of the vehicle diagnostics device and is specifically aimed at avoiding a costly and time-consuming recall. When the present text speaks of "an equipment defect", the vehicle is not in a breakdown situation, no breakdown having been identified by the vehicle diagnostics.

In one embodiment, the selection step is performed by the management server and the method comprises a step in which the management server sends the mobile node a request message containing the selected parameter.

As an alternative, the selection step may be carried out by the mobile node.

According to one aspect of the invention, the method comprises a preliminary step in which the electronic control unit obtains a plurality of data received from the equipment via the wired network.

According to one aspect of the invention, the steps of collecting and sending the data item by the communications module are performed periodically.

According to one feature of the invention, the determination of the subset of vehicles contains the identity of the vehicles in the subset.

An aspect of the invention also relates to a communications module of a motor vehicle, said vehicle comprising at least one piece of equipment of a predetermined type, a wired communications network and an electronic control unit which is configured to receive from said equipment, via said wired communications network, a plurality of data pertaining to a plurality of parameters relating to the equipment, said communications module comprising:

a reception submodule configured to receive, from a mobile node over a radio communications link, a message indicating at least one parameter selected from the plurality of parameters, a collection submodule configured to collect, from the electronic control unit, via the wired communications network, at least one data item from said plurality of data, and a sending submodule configured to send the collected data item to the mobile node.

In one preferred embodiment, the communication module takes the form of a removable electronic key, known as a "dongle", which can be connected removably to the wired communications network of the vehicle, for example by connecting to the vehicle OBD connector. Such an electronic key may thus be used easily and successively in a plurality of different vehicles, for example by a mechanic in order to detect a defect in vehicles of different types.

For preference, the electronic key is programmable so that both public data, namely data that is freely accessible to a user of the vehicle, and private data, namely data accessible only to the manufacturer of the vehicle, can be collected.

An aspect of the invention also relates to a vehicle comprising at least one piece of equipment of a predetermined type associated with a plurality of data pertaining to a plurality of parameters relating to the equipment, a wired communications network, an electronic control unit connected to said equipment via said wired communications network so as to receive said plurality of data, and a communications module as set out hereinabove.

For preference, the communications module is mounted removably in the vehicle, for example taking the form of an electronic key as described hereinabove.

An aspect of the invention also relates to a management server of a radio communications network for the selective recall of at least one motor vehicle from a set of motor vehicles, said vehicle comprising at least one piece of equipment of a predetermined type, a wired communications network and an electronic control unit which is configured to receive from said equipment, via said wired communications network, a plurality of data pertaining to a plurality of parameters relating to the equipment, and a communications module as set out hereinabove, said management server comprising:

a selection module configured to select at least one parameter from among the plurality of parameters, a sending module configured to send a message containing the selected parameter to a mobile node of said radio communications network, a reception module configured to receive at least one data item pertaining to at least one parameter of at least one piece of equipment, sent by said mobile node, an analysis module configured to analyze the data item received, a detection module for detecting a defect with the piece of equipment on the basis of the data item analyzed by estimating, from the data item received, the mean life remaining until the piece of equipment breaks down or, alternatively, the margin until the maximum tolerable wear limit is reached, or alternatively still, the statistical position of a command within the tolerated interval in the design of the equipment, a determination module configured for determining a subset of vehicles comprising the same type of equipment as that for which the defect has been detected, in order to proceed with recalling these, and a transmission module configured to send a selective recall notice out via the radio communications network.

The transmission module is configured to send a selective recall notice out, preferably to the owner of the vehicle.

An aspect of the invention finally relates to a system for selectively recalling at least one motor vehicle from a set of motor vehicles, said system comprising:

at least one motor vehicle comprising at least one piece of equipment of a predetermined type associated with a plurality of data pertaining to a plurality of parameters relating to the equipment, a wired communications network, and an electronic control unit connected to said equipment via said wired communications network so as to receive said plurality of data, at least one communications module as set out hereinabove, connected removably to said wired communications network, and at least one management server as set out hereinabove.

BRIEF DESCRIPTION OF THE DRAWINGS

Other features and advantages of aspects of the invention will emerge during the following description given with reference to the appended figures, which are given by way of nonlimiting example and in which identical references are given to similar objects.

DETAILED DESCRIPTION OF THE PREFERRED EMBODIMENTS

An aspect of the invention relates to a system for selectively recalling at least one motor vehicle from a set of motor vehicles.

Figure 1:
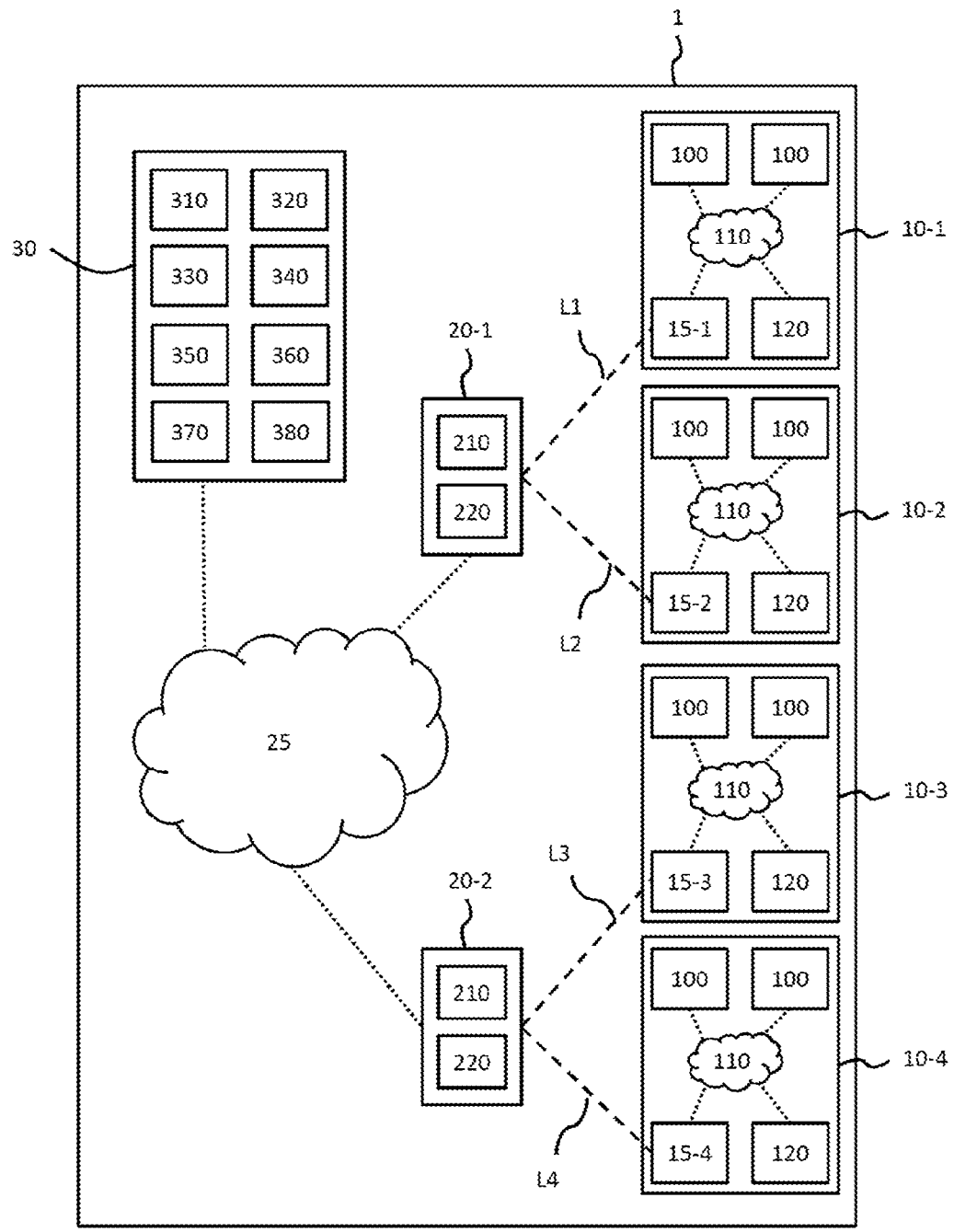
FIG. 1 schematically illustrates one embodiment of the system according town aspect of the invention.

In the nonlimiting example illustrated in FIG. 1, the system 1 according to an aspect of the invention comprises four motor vehicles 10-1, 10-2, 10-3, 10-4, four communications modules 15-1, 15-2, 15-3, 15-4, two mobile nodes 20-1, 20-2, one radio communications network 25 and one management server 30.

Each vehicle 10-1, 10-2, 10-3, 10-4 is characterized by a unique identifier and comprises one or more pieces of equipment 100, each piece of equipment 100 being characterized by its type and being associated with a plurality of data.

For the sake of clarity, the pieces of equipment are mentioned under a single reference 100, but it goes without saying that these pieces of equipment may be of different types and different natures By way of example, these pieces of equipment may be a fuel injection system, and engine management computer, an electronic control system, an air intake and supercharging system, a system for the post-treatment of the exhaust gases, a cooling system, an automated transmission, a steering and braking control system or a dynamic stability control system, etc., it being possible for any vehicle equipment controlled by a computer to be involved.

Each vehicle 10-1, 10-2, 10-3, 10-4 comprises a wired communications network 110, for example of the CAN bus type, and an electronic control unit 120 connected to the equipment 100 via said wired communications network so as to receive the data supplied by the equipment 100.

Each vehicle 10-1, 10-2, 10-3, 10-4 also comprises a communications module 15-1, 15-2, 15-3, 15-4 respectively, mounted for example removably in the associated vehicle 10-1, 10-2, 10-3, 10-4 so as to be connected to the wired communications network 110 to collect all or some of the data received by the electronic control unit 120 and communicate it or them over a radio communications link L1, L2, L3, L4 to a mobile node 20-1, 20-2 of the radio communications network 25.

The management server 30 allows the selective recall of a subset of motor vehicles exhibiting a common defect with one or more of their pieces of equipment 100.

For this purpose, the management server 30 comprises a selection module 310, a sending module 320, a reception module 330, an analysis module 340, a detection module 350, a determination module 360, a transmission module 370 and a memory zone 380 containing all of the parameters relating to the pieces of equipment 100 of the vehicles 10-1, 10-2, 10-3, 10-4 for which a recall could prove necessary, together with a list of identifiers of the vehicles 10-1, 10-2, 10-3, 10-4, each identifier being unique to each vehicle 10-1, 10-2, 10-3, 10-4.

The selection module 310 is configured to select at least one parameter from among the stored plurality of parameters.

The sending module 320 is configured to send the mobile node 20 a message containing the parameter or parameters selected by the selection module 310.

The reception module 330 is configured to receive at least one data item, sent by said mobile node 20, pertaining to at least one parameter of at least one piece of equipment.

The analysis module 340 is configured to analyze the data items) received by the reception module 330.

The detection module 350 is configured to detect a defect with the equipment from the data item(s) analyzed by the analysis module 340.

The determination module 360 is configured to determine a subset of vehicles comprising the same type of equipment as the equipment containing the defect detected by the detection module 350, so that they can be recalled.

The transmission module 370 is configured to send, via the radio communications network 25, a selective recall notice, for example to the owner of the vehicle, to his dealer, to his mechanic, etc. This notice may for example be sent in the form of an email or of a text message of SMS type.

Figure 2:
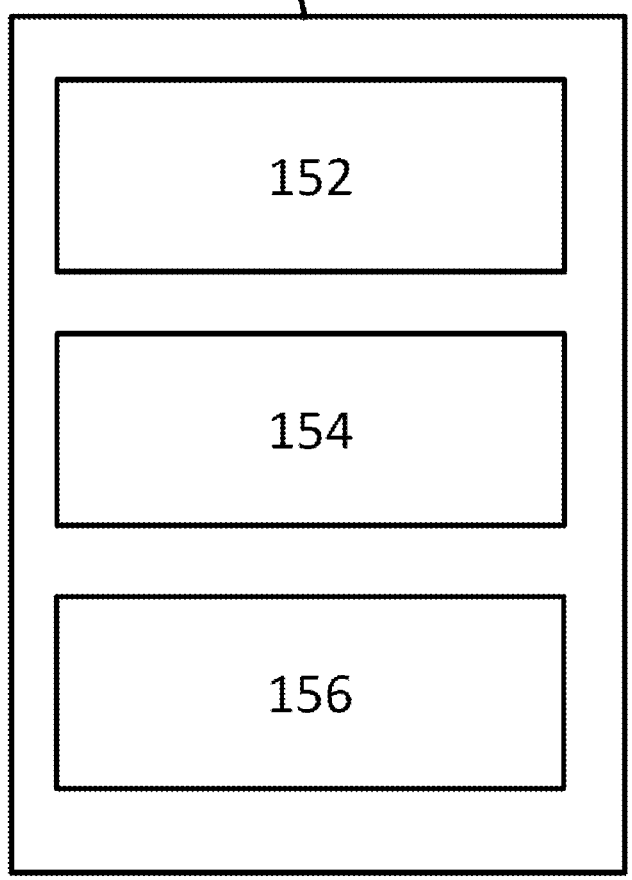
FIG. 2 schematically illustrates one embodiment of a communications module according to an aspect of the invention.

With reference to FIG. 2, each communications module 15-1, 15-2, 15-3, 15-4 comprises a reception submodule 152, a collection submodule 154, and a sending submodule 156.

The reception submodule 152 is configured to receive, from the associated mobile node 20-1, 20-2, over the associated radio communications link L1, L2, L3, L4, a message indicating at least one parameter selected by the management server as described hereinafter.

The collection submodule 154 is configured to collect, from the electronic control unit 120, via the wired communications network 110, at least one data item from said plurality of data.

The sending submodule 156 is configured to send, over the associated radio communications link L1, L2, L3, L4, the data item(s) collected by the collection submodule 154 to the associated mobile node 20-1, 20-2.

In one preferred embodiment, the communications modules 15-1, 15-2, 15-3, 15-4 take the form of a removable electronic key known as a "dongle". Such an electronic key may thus be used easily and successively in a plurality of different vehicles, for example by a mechanic in order to detect a problem. This electronic key is programmable so that both public data, namely data that is freely accessible, and private data, namely data accessible only to the manufacturer of the vehicle, can be collected. The electronic key may, for example, be plugged directly into the OBD (On-Board Diagnostics) connection of the vehicle 10-1, 10-2, 10-3, 10-4.

In order to allow selective recall, each communications module 15-1, 15-2, 15-3, 15-4 is associated with, at least, one mobile node 20-1, 20-2 external to the vehicle 10-1, 10-2, 10-3, 10-4.

In this example, as illustrated nonlimitingly in FIG. 1, a first mobile node 20-1 is able to communicate with a first communications module 15-1 and a second communications module 15-2, respectively, over a first radio communications link L1 and a second radio communications link L2, and a second mobile node 20-2 is able to communicate with a third communications module 15-3 and a fourth communications module 15-4, respectively, over a third radio communications link L3 and a fourth radio communications link L4. The first, second, third and fourth radio communications links L1, L2, L3 et L4 may for example be of the Bluetooth®, Zigbee, Wifi type, or any other suitable radio communications link.

It will be noted that the use of two mobile nodes 20-1, 20-2 does not in any way restrict the scope of the present invention and that it goes without saying that a lower or higher number of mobile nodes could be used. For example, it would be possible to have as many mobile nodes as, or more mobile nodes than, there are communications modules 15-1, 15-2, 15-3, 15-4.

Each mobile node 20-1, 20-2 is a node of the radio communications network 25, which may for example be of GSM, UMTS, LTE etc. type, as may the management server 30, it advantageously being possible for the mobile nodes 20 to be of the smart phone type.

Each mobile node 20-1, 20-2 comprises a reception module 210 and a transmission module 220.

The reception module 210 is first of all configured to receive, from the management server 30, via the radio communications network 25, a request message containing a list of one or more parameters selected by the selection module 310 of the management server 30.

The reception module 210 is then configured to receive, from each communications module 15-1, 15-2, 15-3, 15-4, over the associated radio communications link L1, L2, L3, L4, one or more data items pertaining to the parameter or parameters indicated in a request message received earlier from the management server 30.

The emission module 220 is configured to send to the management server 30, via the radio communications network 25, one or a plurality of data item(s) collected from an associated communications module 15-1, 15-2, 15-3, 15-4.

In another form of embodiment of the system 1 according to an aspect of the invention, it will be noted that the mobile nodes and the management server may be combined, the management server then being configured to communicate directly with the communications modules via the radio communications network 25.

Figure 3:
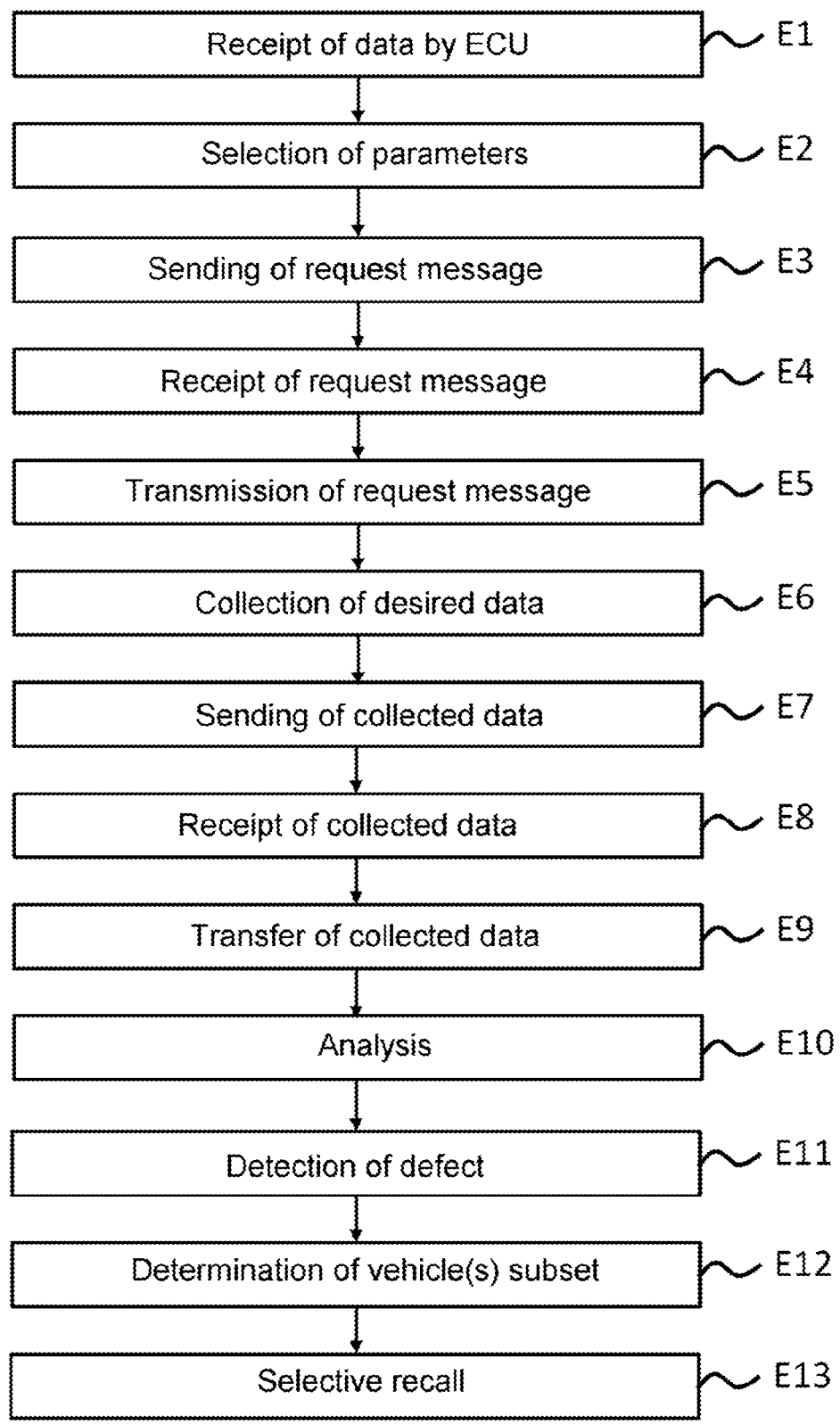
FIG. 3 schematically illustrates an embodiment of the method according to an aspect of the invention.

An aspect of the invention will now be described in its implementation with reference to FIG. 3.

In this nonlimiting example, the first vehicle 10-1 and the third vehicle 10-3 each comprise a piece of equipment 100 of the same type that is defective, whereas the pieces of equipment 100 in the second vehicle 10-2 and the fourth vehicle 10-4 do not have a fault.

In a step E1, each electronic control unit 120 of each vehicle 10-1, 10-2, 10-3, 10-4 receives data from one or more pieces of equipment 100 of said vehicle 10-1, 10-2, 10-3, 10-4, via the corresponding wired communications network 110. This step E1 is performed continuously or periodically, at least when the pieces of equipment 100 of the vehicle 10-1, 10-2, 10-3, 10-4 are being powered, independently of the next steps.

In order to determine whether one or more pieces of equipment of the vehicles 10-1, 10-2, 10-3, 10-4 are defective, the selection module 310 of the management server 30 selects, in a step E2, one or more parameters for one or more pieces of equipment 100 from among the plurality of parameters stored in the memory zone 380. In this example, the detection module 310 of the management server 30 selects one or more parameters relating to the defective piece of equipment 100 of the first vehicle 10-1 and of the third vehicle 10-3.

The sending module 320 of the management server 30 then, in a step E3, sends to the first mobile node 20-1 and to the second mobile node 20-2, via the radio communications network 25, a request message containing the parameter or parameters selected by the selection module 310.

The first mobile node 20-1 then, in a step E4, receives the request message via its reception module 210 and then in a step E5, transmits it, with or without modification, via its emission module 220, to the first communications module 15-1 and to the second communications module 15-2.

Likewise, the second mobile node 20-2, again in step E4, receives the request message sent by the management server 30 via its reception module 210 and then, again in step E5, transmits it, with or without modification, via its emission module 220, to the third communications module 15-3 and to the fourth communications module 15-4.

Each communications module 15-1, 15-2, 15-3, 15-4 then periodically, in a step E6, and via the wired communications network 110, collects the data relating to the parameters contained in the request message from the electronic control unit 120 and then sends them on, accompanied by the identifier of the corresponding vehicle, still periodically, in a step E7 to the associated communications node 20-1, 20-2 over the corresponding radio communications link L1, L2, L3, L4.

The data sent by the first communications module 15-1 and the second communications module 15-2 are received, in a step E8, by the reception module 210 of the first mobile node 20-1 and are sent, in a step E9, by the transmission module 220 of the first mobile node 20-1 to the reception module 330 of the management server 30.

Likewise, the data sent by the third communications module 15-3 and the fourth communications module 15-4 are received, again in step E8, by the reception module 210 of the second mobile node 20-2 and are sent, again in step E9, by the transmission module 220 of the second mobile node 20-2 to the reception module 330 of the management server 30.

The analysis module 340 then, in a step E10, analyzes the data item or items received by the reception module 330 and the detection module 350, in a step E11, detects the defect with the defective equipment 100 of the first vehicle 10-1 and the defect with the defective equipment 100 of the second vehicle 10-2.

The detection of a defect with a piece of equipment 100 may, for example, be performed by estimating, from the plurality of data received, the mean life remaining until the piece of equipment 100 breaks down or, alternatively, the margin until the maximum tolerable wear limit is reached, or alternatively still, the statistical position of a command within the tolerated interval in the design of the equipment 100. It will be noted that this list of criteria describing the breakdown does not in any way restrict the scope of the present invention, it being possible for the analysis module 340 consider all the features in the control of the equipment 100 that enable components that are defective to be differentiated from those which are not.

The determination module 360 then, in a step E12, determines a subset made up of the first vehicle 10-1 and of the third vehicle 10-3 from their identifiers sent by the first communications module 15-1 and the third communications module 15-3.

Finally, the transmission module 370, in a step E13 and via the radio communications network 25 sends a selective recall notice to the individual to be contacted in the event of a defect and whose contact details are stored in the memory zone 380 for the first vehicle 10-1 and the second vehicle 10-2, it being possible for this note to be sent, for example, by email or by text message of SMS type.

Finally, it should be noted that the present invention is not limited to the examples described hereinabove, and is open to many variants that are accessible to those skilled in the art.

The invention claimed is:

1. A method for selectively recalling, using a radio communications network management server, at least one motor vehicle from a collection of motor vehicles, said vehicle comprising at least one piece of equipment of a predetermined type, a wired communications network and an electronic control unit which is configured to receive from said equipment, via said wired communications network, a plurality of data pertaining to a plurality of parameters relating to the equipment, and a communications module configured to collect, from the electronic control unit, via the wired communications network, at least one data item from said plurality of data and communicate the at least one data item, over a radio communications link, to a mobile node of said radio communications network, said method comprising:

selecting at least one parameter from among the plurality of parameters, sending to the communications module, via the mobile node, a message indicating the parameter selected, collecting from the electronic control unit at least one data item relating to said selected parameter, this collection being performed by the communications module, via the wired communications network, sending the collected data item from the communications module to the mobile node, sending the sent data item by the mobile node, to the management server, analyzing, by the management server, the data item received, detecting a defect with the piece of equipment on the basis of the data item analyzed by estimating, from the data item received, a mean life remaining until the piece of equipment breaks down or, alternatively, a margin until a maximum tolerable wear limit is reached, or alternatively still, a statistical position of a command within the tolerated interval in the design of the equipment, determining a subset of vehicles comprising the piece of equipment for which a defect has been detected, in order to proceed with recalling these, and sending, by the management server, a selective recall notice.

2. The method as claimed in claim 1, wherein the selection step is performed by the management server and the method comprises a step in which the management server sends the mobile node a request message containing the selected parameter.

3. A management server of a radio communications network for the selective recall of at least one motor vehicle, from a set of motor vehicles, said vehicle comprising at least one piece of equipment for executing functions of the vehicle, a wired communications network, an electronic control unit which is configured to receive from said equipment, via said wired communications network, a plurality of data pertaining to a plurality of parameters relating to the equipment, and a communications module including a reception submodule configured to receive, from a mobile node over a radio communications link, a message indicating at least one parameter selected from the plurality of parameters, a collection submodule configured to collect, from the electronic control unit, via the wired communications network, at least one data item from said plurality of data, and a sending submodule configured to send the collected data item to the mobile node, said management server comprising:

a selection module configured to select at least one parameter from among the plurality of parameters, a sending module configured to send a message containing the selected parameter to a mobile node of said radio communications network, a reception module configured to receive at least one data item pertaining to at least one parameter of at least one piece of equipment, sent by said mobile node, an analysis module configured to analyze the data item received, a detection module for detecting a defect with the piece of equipment on the basis of the data item analyzed by estimating, from the data item received, a mean life remaining until the equipment item breaks down or, alternatively, a margin until a maximum tolerable wear limit is reached, or alternatively still, a statistical position of a command within the tolerated interval in the design of the equipment, a determination module configured for determining a subset of vehicles comprising the same type of equipment as that for which the defect has been detected, in order to proceed with recalling these, and a transmission module configured to send a selective recall notice out via the radio communications network.

4. A system for selectively recalling at least one motor vehicle from a set of motor vehicles, said system comprising:

at least one motor vehicle comprising at least one piece of equipment for executing functions of the vehicle, the at least one piece of equipment associated with a plurality of data pertaining to a plurality of parameters relating to the equipment, a wired communications network, and an electronic control unit connected to said equipment via said wired communications network so as to receive said plurality of data, at least one communications module, connected removably to said wired communications network, the communication module comprising:

a reception submodule configured to receive, from a mobile node over a radio communications link, a message indicating at least one parameter selected from the plurality of parameters, a collection submodule configured to collect, from the electronic control unit, via the wired communications network, at least one data item from said plurality of data, and a sending submodule configured to send the collected data item to the mobile node, wherein the communication module is in the form of a removable electronic key that can be connected removably to the wired communications network of the vehicle, and wherein the electronic key is programmable so that both public data, that is freely accessible to a user of the vehicle, and private data, accessible only to the manufacturer of the vehicle, can both be collected, and at least one management server including:
- a selection module configured to select at least one parameter from among the plurality of parameters,
- a sending module configured to send a message containing the selected parameter to a mobile node of said radio communications network,
- a reception module configured to receive at least one data item pertaining to at least one parameter of at least one piece of equipment, sent by said mobile node,
- an analysis module configured to analyze the data item received,
- a detection module for detecting a defect with the piece of equipment on the basis of the data item analyzed by estimating, from the data item received, a mean life remaining until the equipment item breaks down or, alternatively, a margin until a maximum tolerable wear limit is reached, or alternatively still, a statistical position of a command within the tolerated interval in the design of the equipment,
- a determination module configured for determining a subset of vehicles comprising the same type of equipment as that for which the defect has been detected, in order to proceed with recalling these, and
- a transmission module configured to send a selective recall notice out via the radio communications network.

* * * * *

UNITED STATES PATENT AND TRADEMARK OFFICE
CERTIFICATE OF CORRECTION

PATENT NO. : 10,733,815 B2
APPLICATION NO. : 16/060170
DATED : August 4, 2020
INVENTOR(S) : Julien Geeroms and Jean-Francois Girard It is certified that error appears in the above-identified patent and that said Letters Patent is hereby corrected as shown below:

In the Claims

In Column 9, Line 36, "sending to the communications module," should begin a new paragraph.

Signed and Sealed this
Third Day of September, 2024

Katherine Kelly Vidal
*Director of the United States Patent and Trademark Office*